United States Patent
Huang et al.

(10) Patent No.: US 9,049,766 B2
(45) Date of Patent: Jun. 2, 2015

(54) AVOID AUDIO NOISE OF A LED DRIVER DURING PWM DIMMING

(71) Applicant: Richtek Technology Corporation, Chupei, Hsinchu (TW)

(72) Inventors: Tsung-Wei Huang, Jubei (TW); Shui-Mu Lin, Longjing Township, Taichung County (TW); Huan-Chien Yang, Pingtung (TW); Nang-Ching Yeung, Zhubei (TW); Ti-Ti Liu, Taipei (TW)

(73) Assignee: RICHTEK TECHNOLOGY CORP., Chupei, Hsinchu (TW)

( * ) Notice: Subject to any disclaimer, the term of this patent is extended or adjusted under 35 U.S.C. 154(b) by 233 days.

(21) Appl. No.: 13/921,523

(22) Filed: Jun. 19, 2013

(65) Prior Publication Data
US 2013/0342124 A1   Dec. 26, 2013

(30) Foreign Application Priority Data

Jun. 21, 2012   (TW) .............................. 101122160 A

(51) Int. Cl.
| H05B 37/02 | (2006.01) |
| H05B 39/04 | (2006.01) |
| H05B 41/36 | (2006.01) |
| H05B 33/08 | (2006.01) |

(52) U.S. Cl.
CPC ........ *H05B 33/0839* (2013.01); *H05B 33/0815* (2013.01); *H05B 33/0827* (2013.01); *Y02B 20/347* (2013.01)

(58) Field of Classification Search
USPC ......................................... 315/201, 209, 210
See application file for complete search history.

(56) References Cited

U.S. PATENT DOCUMENTS

| 8,487,546 | B2* | 7/2013 | Melanson | 315/291 |
| 2004/0046683 | A1* | 3/2004 | Mitamura et al. | 341/144 |
| 2006/0261754 | A1* | 11/2006 | Lee | 315/291 |
| 2013/0229119 | A1* | 9/2013 | Korobov et al. | 315/185 R |
| 2013/0229120 | A1* | 9/2013 | Choutov et al. | 315/186 |
| 2013/0229124 | A1* | 9/2013 | Livschitz et al. | 315/201 |
| 2013/0249405 | A1* | 9/2013 | Cahalane et al. | 315/114 |
| 2013/0249431 | A1* | 9/2013 | Shteynberg et al. | 315/287 |
| 2013/0300305 | A1* | 11/2013 | Wray | 315/210 |
| 2014/0042922 | A1* | 2/2014 | Wu et al. | 315/201 |
| 2014/0042933 | A1* | 2/2014 | Livschitz et al. | 315/307 |
| 2014/0167634 | A1* | 6/2014 | Ivankovic et al. | 315/210 |
| 2014/0184076 | A1* | 7/2014 | Murphy | 315/121 |
| 2014/0354170 | A1* | 12/2014 | Gredler et al. | 315/224 |

* cited by examiner

*Primary Examiner* — Adam Houston
(74) *Attorney, Agent, or Firm* — Muncy, Geissler, Olds & Lowe, P.C.

(57) ABSTRACT

A LED driver using a PWM signal for dimming control includes a power converter and a current regulator. The power converter provides an output voltage and a load current for a plurality of LEDs. The current regulator provides a load current dependent signal for the power converter to speed up load transient response caused by variation of the load current, to reduce the ripple of the output voltage, and thereby to avoid audio noise during PWM dimming.

17 Claims, 12 Drawing Sheets

AVOID AUDIO NOISE OF A LED DRIVER DURING PWM DIMMING

FIELD OF THE INVENTION

The present invention is related generally to a light-emitting diode (LED) driver and, more particularly, to a LED driver using a pulse-width modulation (PWM) signal for dimming control.

BACKGROUND OF THE INVENTION

Referring to FIG. 1, a LED driver, including a power converter 10, a current regulator 12, and a compensator 14, provides an output voltage Vout and a load current Iload to drive a plurality of LED strings 16. The power converter 10 converts an input voltage Vin into the output voltage Vout, and the current regulator 12 controls the current of each LED string 16 to thereby control the brightness of the LEDs. The current regulator 12 includes a plurality of control terminals VS1-VSN, each of which is connected to a respective one of the LED strings 16, and a plurality of transistors M1-MN as switches connected to the control terminals VS1-VSN respectively and controlled by a PWM signal Spwmi. The current, and consequently the brightness, of each LED string 16 can be adjusted by adjusting the duty ratio of the PWM signal Spwmi. The compensator 14 is connected to a feedback path of the power converter 10 to filter out noise in the feedback loop and to stabilize a compensation voltage Vcomp. FIG. 2 is a waveform diagram of the signals shown in FIG. 1. When the PWM signal Spwmi is triggered or terminated, the gate voltages VG1-VGN of the transistors M1-MN are simultaneously turned to a high level or a low level to simultaneously turn on or off the transistors M1-MN. As a result, all the LED strings 16 are activated or deactivated at a same time, and thus the load current Iload provided by the power converter 10 rises or falls abruptly, causing ripples 18 in the output voltage Vout of the power converter 10. The output capacitor Cout will be charged or discharged by the ripples 18 and thus generates audio noise.

FIG. 3 depicts one conventional method for reducing the audio noise, which employs phase delay technique in the current regulator 12 to apply different delay to the LED strings 16. Thus, when the PWM signal Spwmi is triggered or terminated, the LED strings 16 are activated or deactivated at different times, and thereby the load current Iload increases or decreases step by step. This avoids an instant large change in the load current Iload, and thereby reduces the amplitude of the ripples 18 in the output voltage Vout to alleviate the audio noise problem.

SUMMARY OF THE INVENTION

An objective of the present invention is to provide circuit and method to avoid audio noise of a LED driver during PWM dimming.

According to the present invention, a LED driver includes a power converter and a current regulator, the power converter provides an output voltage and a load current for a plurality of LEDs, and includes an operational amplifier and a PWM logic circuit, the operational amplifier amplifies the difference between a reference voltage and a feedback signal related to the output voltage to generate a compensation voltage, the PWM logic circuit generates a control signal according to the compensation voltage and a ramp signal, the control signal has a duty ratio for regulating the output voltage, and the current regulator includes a plurality of control terminals connected to the plurality of LEDs respectively, adjusts the currents flowing through the plurality of control terminals responsive to a PWM signal to adjust the load current, and generates a sense signal related to the load current to adjust the duty ratio.

According to the present invention, a method for a LED driver includes providing an output voltage and a load current for a plurality of LEDs, detecting the output voltage to generate a feedback signal, amplifying the difference between a reference voltage and the feedback signal to generate a compensation voltage, generating a control signal according to the compensation voltage and a ramp signal to regulate the output voltage, adjusting the currents of the plurality of LEDs responsive to a PWM signal to adjust the load current, and generating a sense signal related to the load current to adjust the duty ratio of the control signal.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
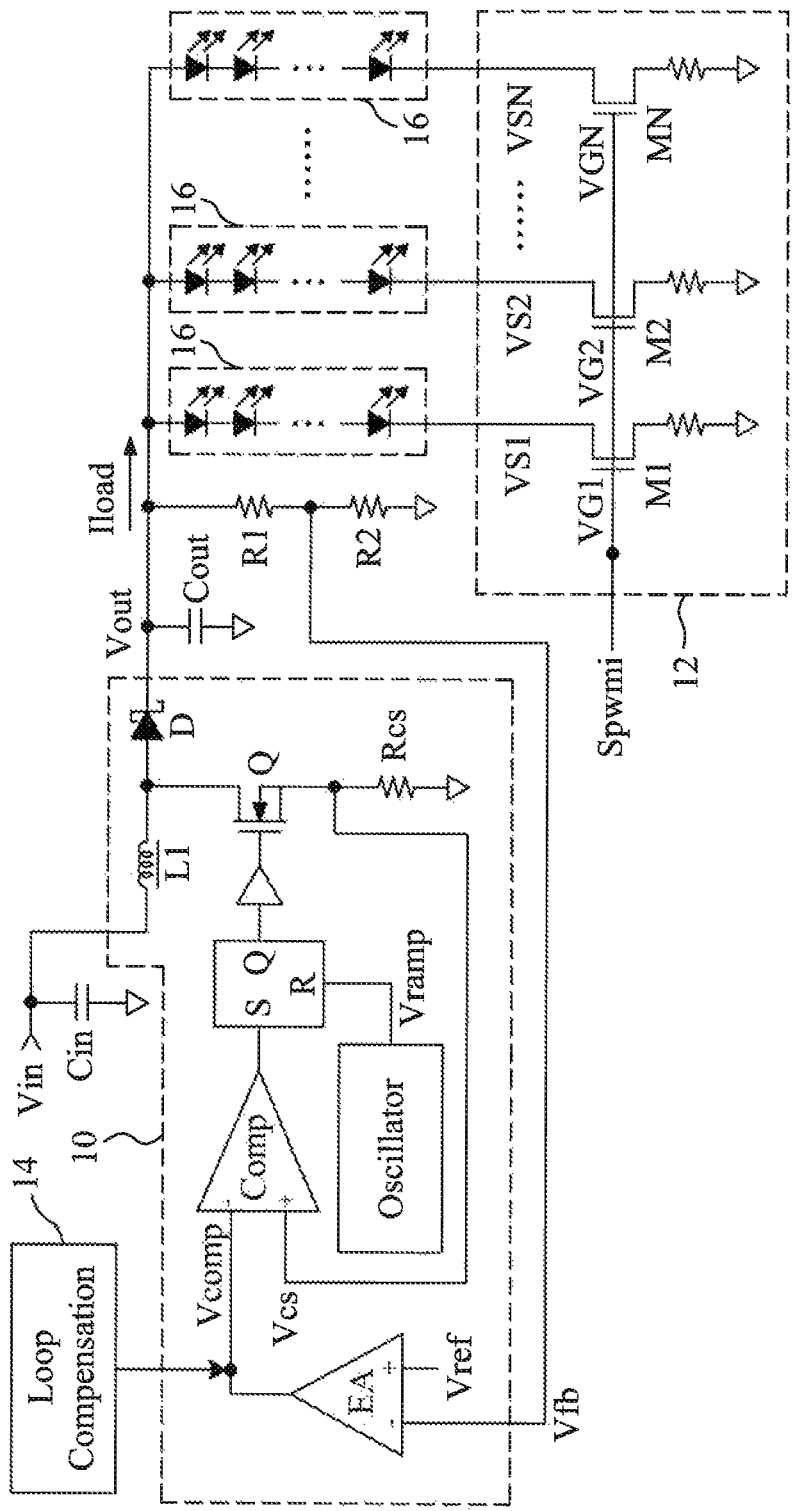
FIG. 1 is a circuit diagram of a conventional LED driver using a PWM signal for dimming control.
Figure 2:
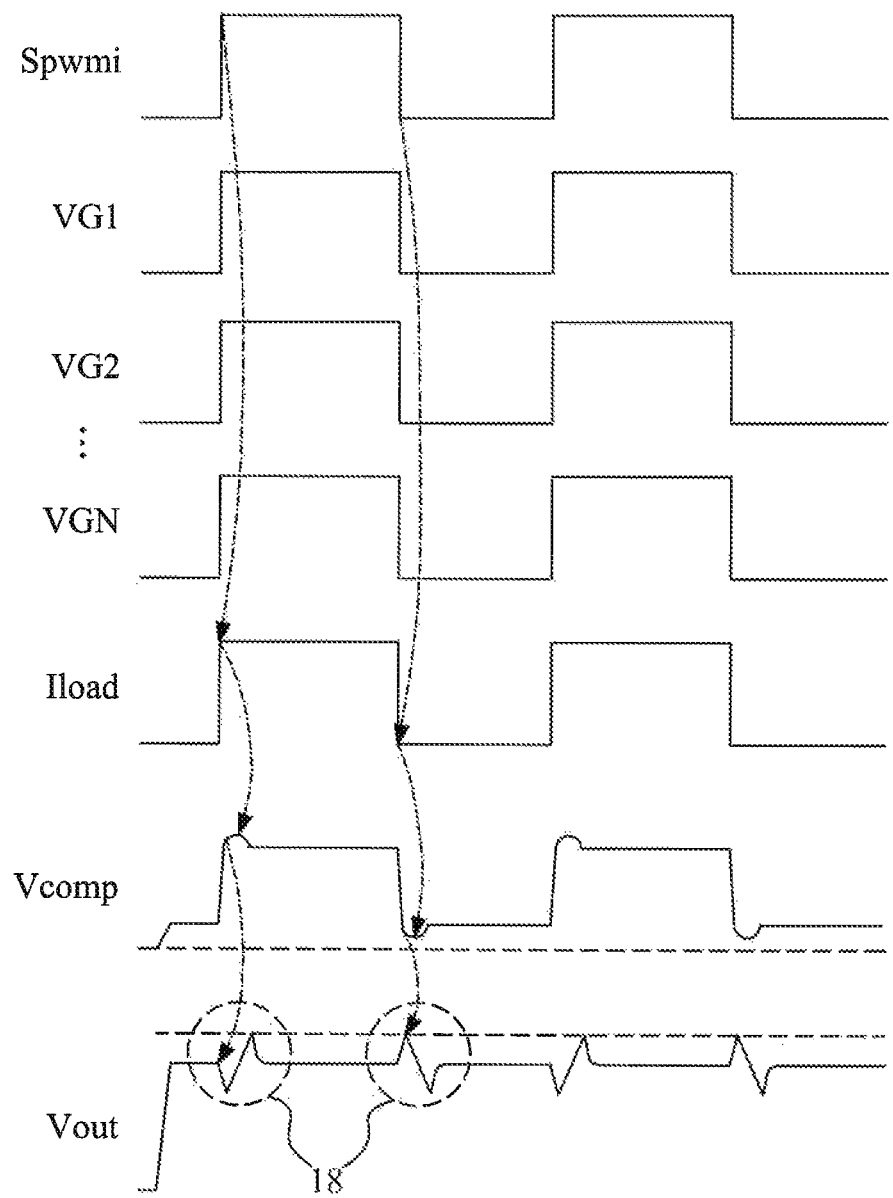
FIG. 2 is a waveform diagram of the signals shown in FIG. 1.
Figure 3:
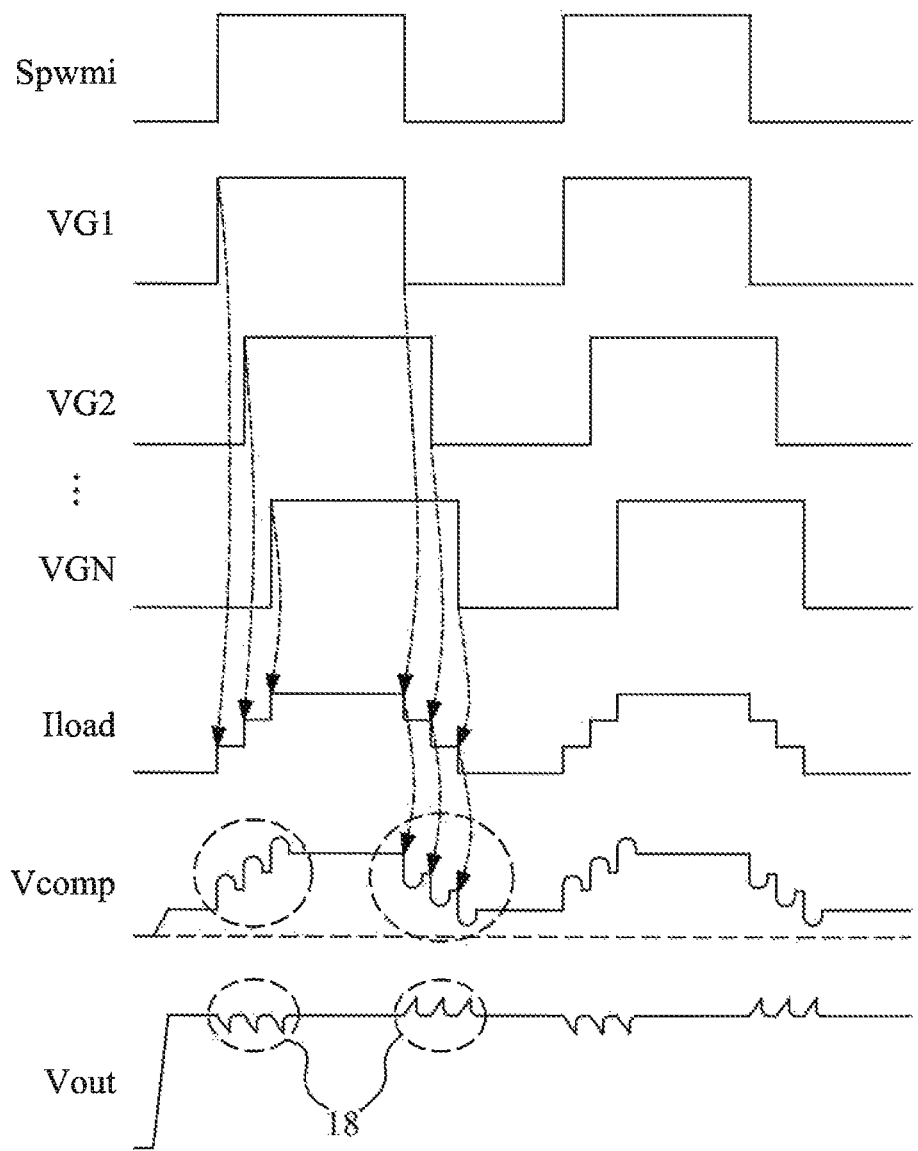
FIG. 3 depicts one conventional method for reducing audio noise of a LED driver during PWM dimming.
Figure 4:
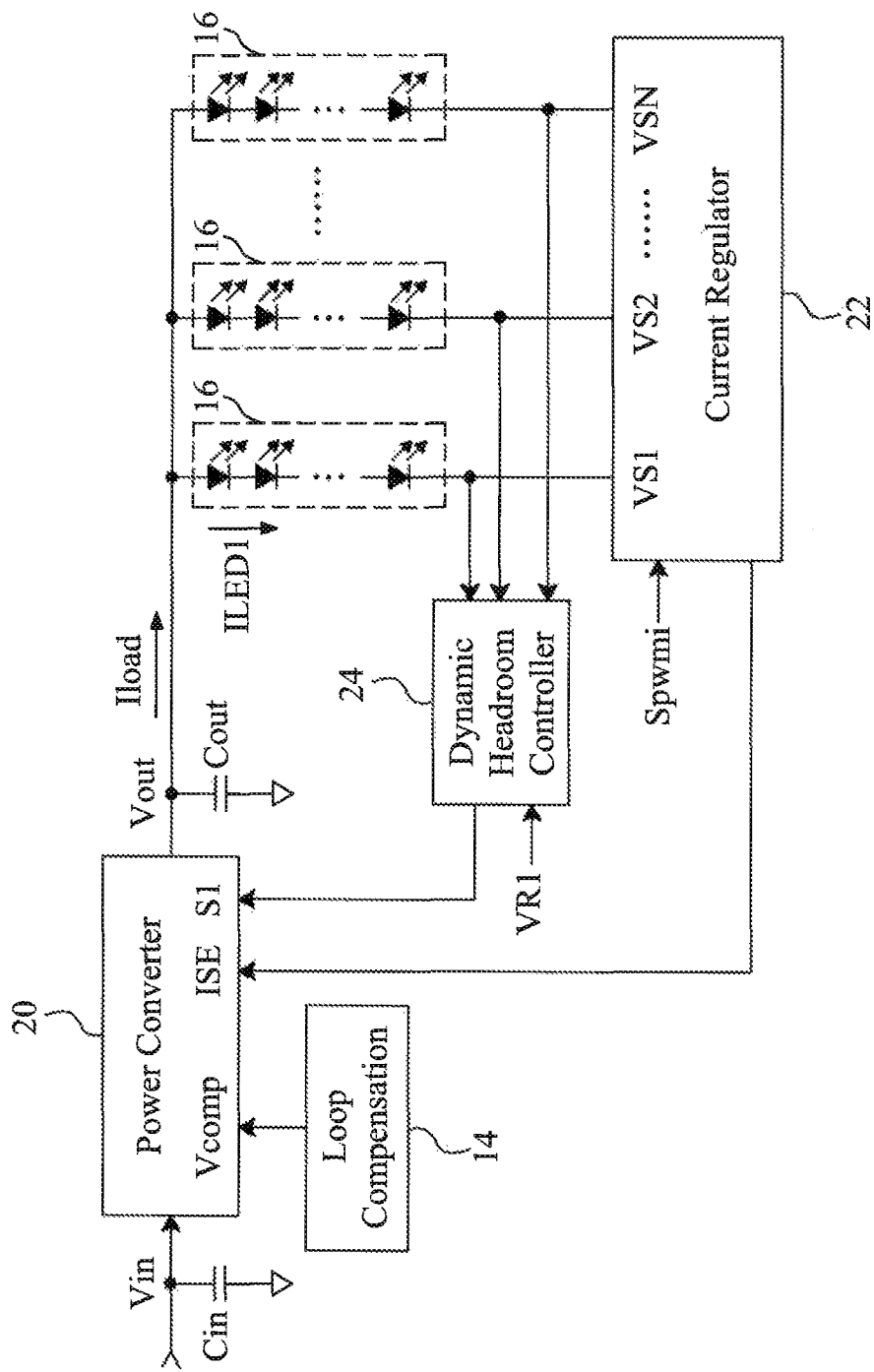
FIG. 4 is a block diagram of a LED driver according to the present invention.

FIG. 4 is a block diagram of a LED driver according to the present invention, which includes a compensator 14, a power converter 20, a current regulator 22, and a dynamic headroom controller 24. The power converter 20 can be a DC-to-DC power converter or an AC-to-DC power converter, to provide an output voltage Vout and a load current Iload for LED strings 16. The current regulator 22 includes a plurality of control terminals VS1-VSN connected to the output terminals of the LED strings 16 respectively. In addition to activating or deactivating the LED strings 16 according to a PWM signal Spwmi, the current regulator 22 generates a sense signal ISE related to the load current Iload to apply to the power converter 20 such that the power converter 20 is informed in advance of any variation of the load current Iload and speeds up the load transient response. The dynamic headroom controller 24 detects the voltages VS1-VSN at the output terminals of the LED strings 16 to generate a detection signal S1 applied to the feedback path of the power converter 20 to keep the voltages VS1-VSN at a reference voltage VR1 and to make the compensation voltage Vcomp achieve the offset rapidly and accurately. Thus, the output of the power converter 20 is stabilized, and the ripples in the output voltage Vout are reduced in amplitude to prevent the output capacitor Cout from making annoying audio noise. Details of the dynamic headroom controller 24 may refer to U.S. Patent Application Publication No. 2010/0013395.

Figure 5A:
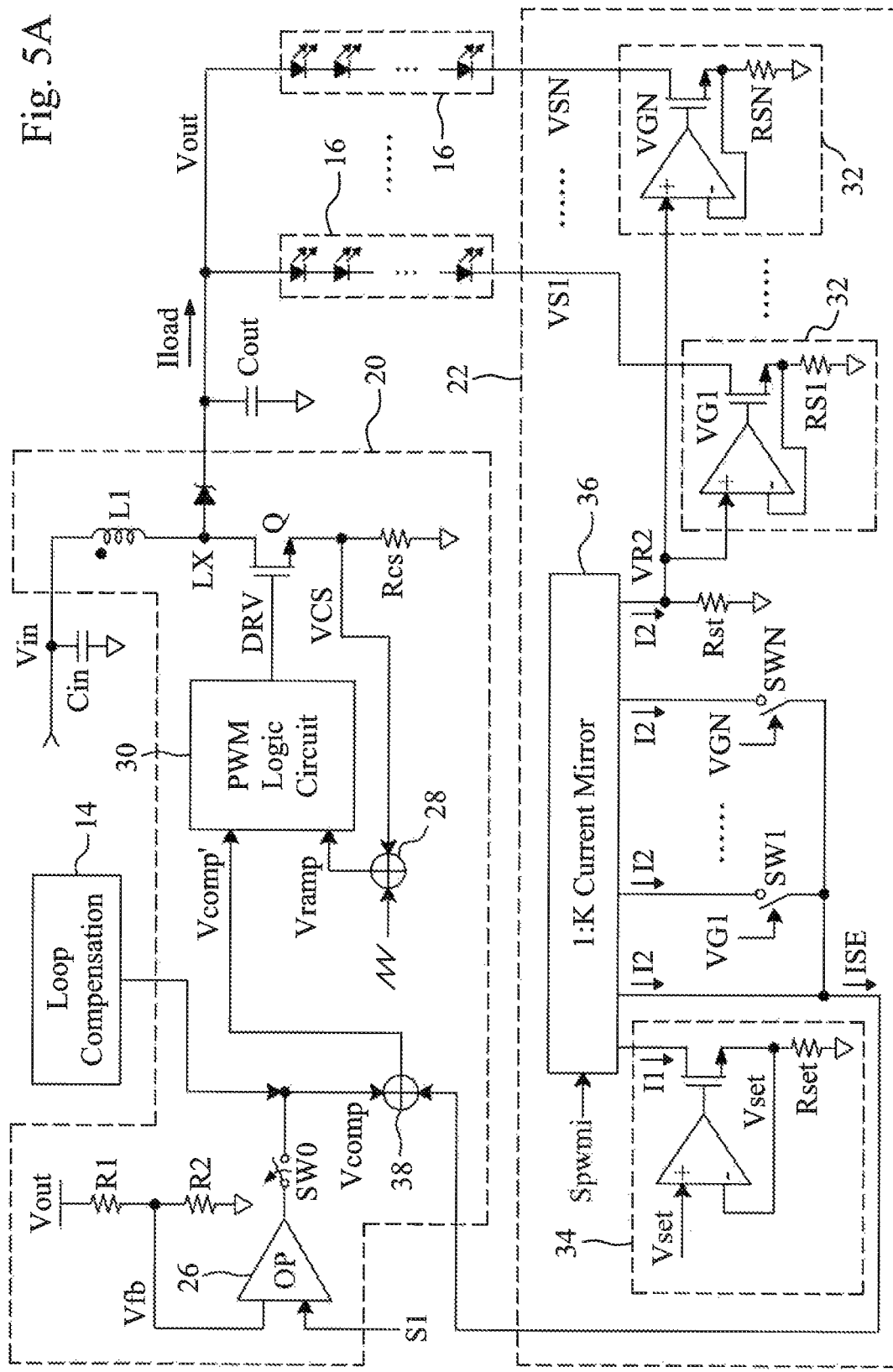
FIGS. 5A and 5B are circuit diagrams of a first embodiment of the LED driver shown in FIG. 4.
Figure 5B:
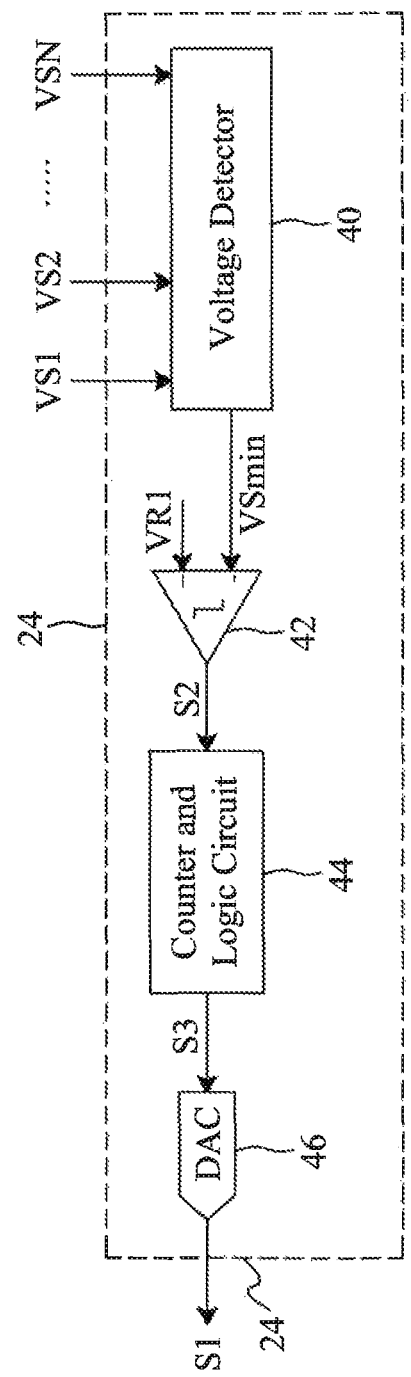

FIGS. 5A and 5B are circuit diagrams of a first embodiment of the LED driver shown in FIG. 4. In this embodiment, the power converter 20 is a boost power converter. As shown in FIG. 5A, resistors R1 and R2 establish a voltage divider to divide the output voltage Vout to generate a feedback signal Vfb, an operational amplifier 26 amplifies the difference between the feedback signal Vfb and the reference voltage S1 to generate the compensation voltage Vcomp, and a switch SW0 is connected between the operational amplifier 26 and an adder 38. When all the LED strings 16 are deactivated, the switch SW0 is turned off to prevent the compensation voltage Vcomp from flickering resulted from noise at the feedback terminal Vfb. The adder 38 combines the compensation voltage Vcomp with the sense signal ISE to generate a compensation voltage Vcomp', a PWM logic circuit 30 generates a control signal DRV according to the compensation voltage Vcomp' and the ramp signal Vramp generated by a ramp generation circuit 28, and the control signal DRV switches a switch Q to regulate the output voltage Vout. In this embodiment, the compensator 14 is connected to the path between the switch SW0 and the adder 38 for keeping the compensation voltage Vcomp stable. In the current regulator 22, a current generation circuit 34 provides a first current I1=Vset/Rset, a current mirror 36 is activated when the PWM signal Spwmi is triggered, to mirror the first current I1 to generate a second current I2=K×I1 and the sense signal ISE=I2×(n+1), where n is the number of the LED strings 16, a plurality of switch circuits 32 are connected to the plurality of control terminals VS1-VSN respectively, and a resistor Rst generates a voltage VR2 according to the current I2 to simultaneously activate all the switch circuits 32 and hence all the LED strings 16.

As shown in FIG. 5A, each switch circuit 32 in the current regulator 22 includes an operational amplifier to apply the voltage VR2 to a corresponding resistor RS1-RSN, thereby determining the current of each LED string 16. Assuming that the resistance values of the resistors RS1-RSN are all equal to RS, it will determine the load current $$Iload = (VR2/RS) \times n \qquad [EQ\text{-}1]$$
$$= [(I2 \times Rst)/RS] \times n$$
$$= [(K \times I1 \times Rst)/RS] \times n$$
$$= \{[(Vset/Rset) \times K \times Rst]/RS\} \times n.$$

When all the switch circuits 32 are activated, the switches SW1-SWN that are connected in parallel between the current mirror 36 and the output terminal ISE of the current regulator 22 are turned on, and thus $$ISE = I2 \times (n+1) \qquad [EQ\text{-}2]$$
$$= I1 \times K \times (n+1)$$
$$= (Vset/Rset) \times K \times (n+1).$$

The equation EQ-2 can be rewritten as $$ISE/(n+1) = (Vset/Rset) \times K. \qquad [EQ\text{-}3]$$

By substituting the equation EQ-3 into the equation EQ-1, the load current $$Iload = \{[ISE/(n+1)] \times Rst/RS\} \times n \qquad [EQ\text{-}4]$$
$$= ISE \times (Rst/RS) \times n/(n+1).$$

Figure 6:
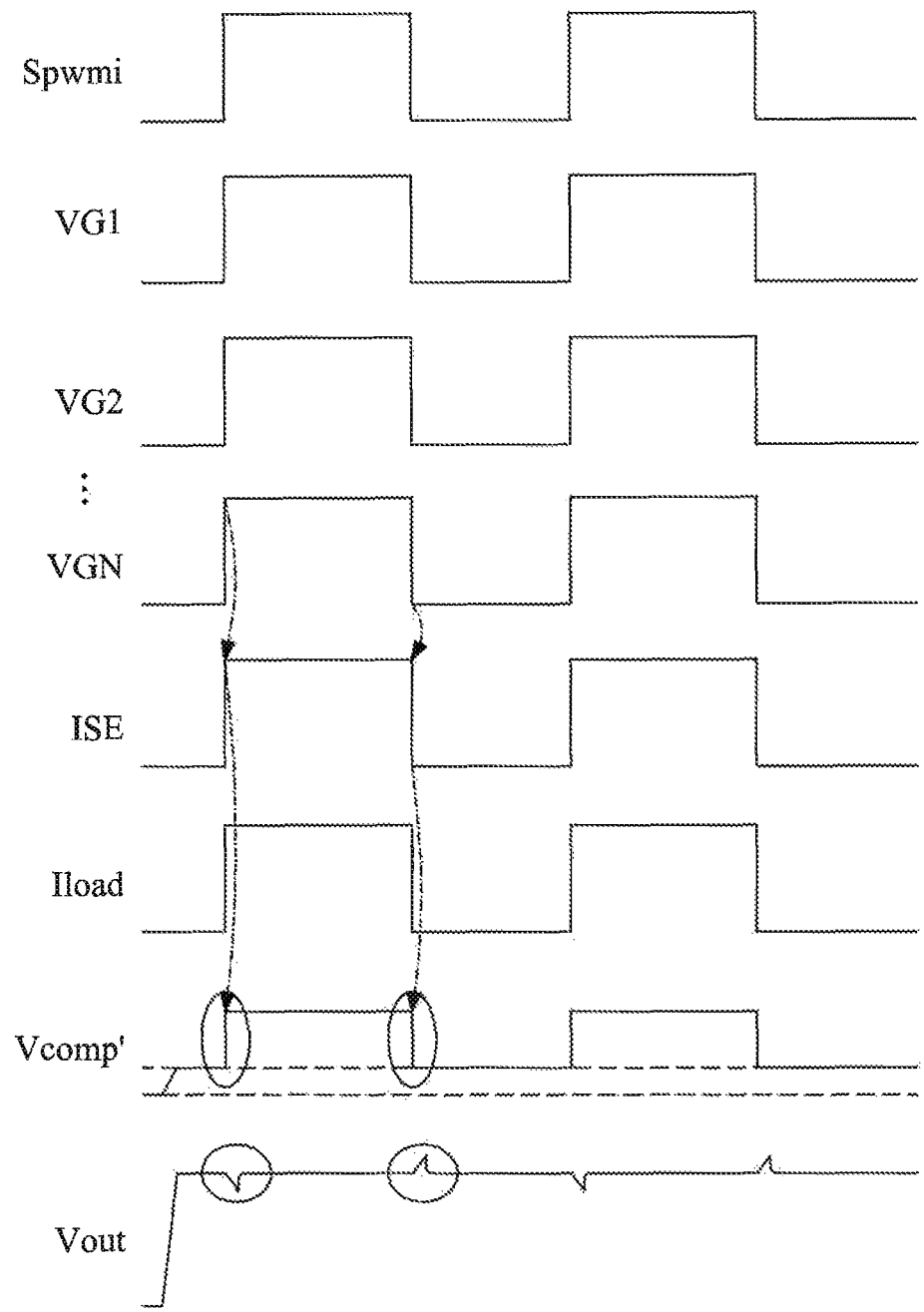
FIG. 6 is a waveform diagram of the signals shown in FIG. 5A.

Since Rst, RS, and n are fixed values, the sense signal ISE is proportional to the load current Iload. During PWM dimming, the compensation voltage Vcomp'=Vcomp+ISE in the power converter 20 varies with the load current Iload as soon as the latter varies, and the duty ratio of the control signal DRV is thus adjusted to speed up load transient response, thereby reducing the ripple amplitude of the output voltage Vout. As shown in the waveform diagram of FIG. 6, when the load current Iload rises, the compensation voltage Vcomp' rises immediately to adjust the duty ratio of the control signal DRV in such a way that more energy is supplied to the output capacitor Cout, thereby reducing the downward amplitude of the output voltage Vout. When the load current Iload falls, the compensation voltage Vcomp' falls immediately to adjust the duty ratio of the control signal DRV in such a way that less energy is supplied to the output capacitor Cout, thereby reducing the upward amplitude of the output voltage Vout.

In the dynamic headroom controller 24 shown in FIG. 5B, a voltage detector 40 detects the voltages VS1-VSN at the output terminals of the LED strings 16 to extract the minimum one of the voltages VS1-VSN as the minimum voltage VSmin, a hysteretic comparator 42 compares the reference voltage VR1 with the minimum voltage VSmin to generate a comparison signal S2, and a counter and logic circuit 44 provides a digital signal S3 and adjusts the digital signal S3 according to the comparison signal S2. More specifically, the counter and logic circuit 44 increases the digital signal 53 when VR1>VSmin and decreases the digital signal S3 when VR1<VSmin. A digital-to-analog converter 46 converts the digital signal S3 into the detection signal S1. Referring to FIG. 5A, the detection signal Si serves as the reference voltage to compare with the feedback signal Vfb to generate the compensation voltage Vcomp. By adjusting the detection signal S1, the speed at which the compensation voltage Vcomp is changed can be increased.

Figure 7:
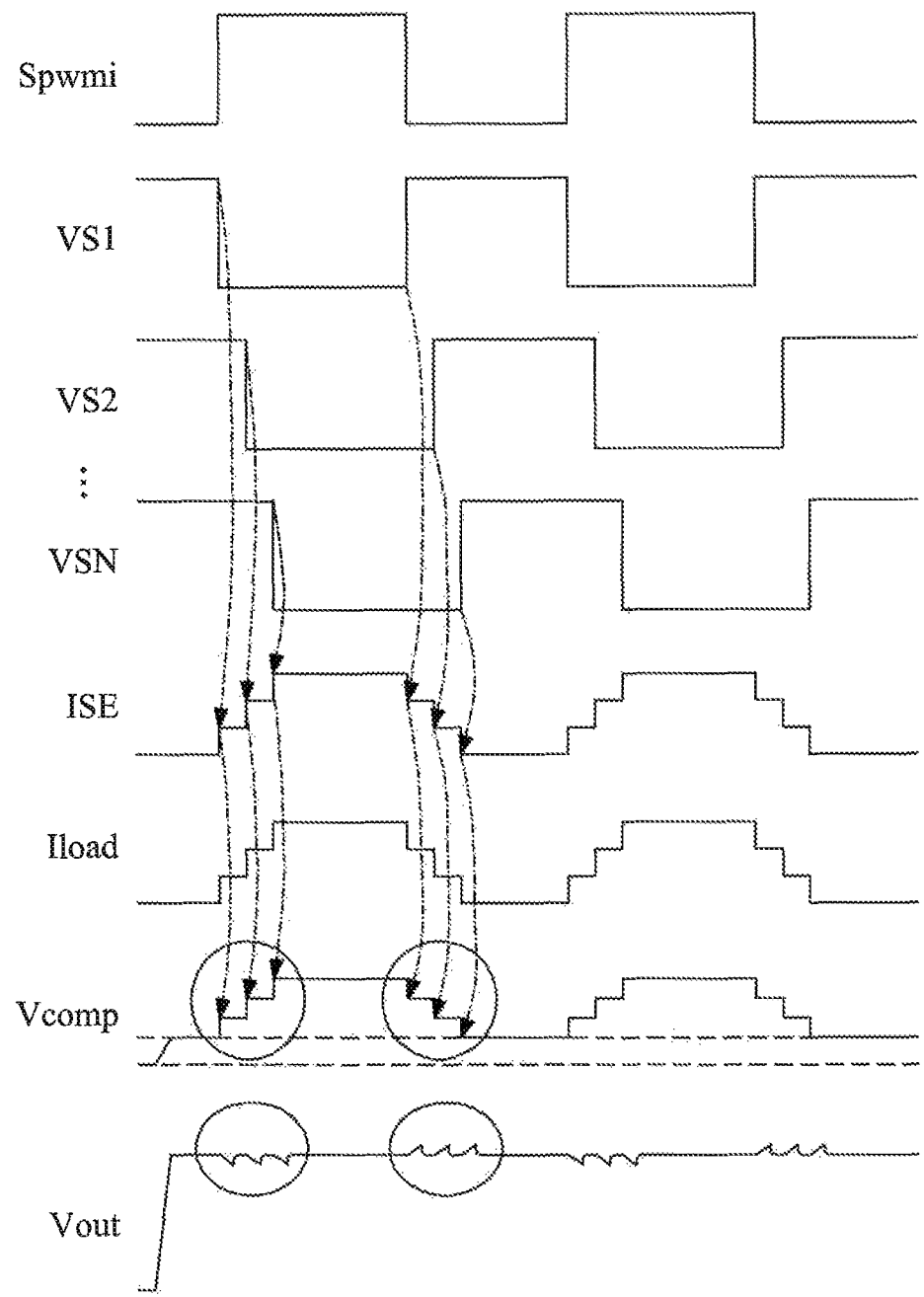
FIG. 7 is a waveform diagram of the signals shown in FIG. 5A when the circuit of FIG. 5A employs phase delay technique.

In the embodiment shown in FIGS. 5A and 5B, both the detection signal S1 and the sense signal ISE are input to the feedback path of the power converter 20 so as for the compensation voltage Vcomp' to rapidly and accurately reach the desired voltage level and for the power converter 20 to speed up load transient response. Besides, the phase delay technique can be applied to the embodiment of FIGS. 5A and 5B to further reduce the ripple amplitude of the output voltage Vout, as shown by the waveform diagram of FIG. 7. Assuming that the switch circuits 32 are provided with delay circuits of different delay times respectively, the switch circuits 32 will be activated or deactivated at different times, which makes the load current Iload to increase or decrease step by step and thus reduces the ripple amplitude of the output voltage Vout. Since the switches SW1-SWN are turned on or off in response to the activation or deactivation of their respective switch circuits 32, the times at which the switches SW1-SWN are turned on or off are also staggered. Consequently, the sense signal ISE rises or falls stepwise along with the load current Iload, and the compensation voltage Vcomp also varies stepwise to reflect in real time the variation of the load current Iload and thereby accelerate load transient response.

Figure 8A:
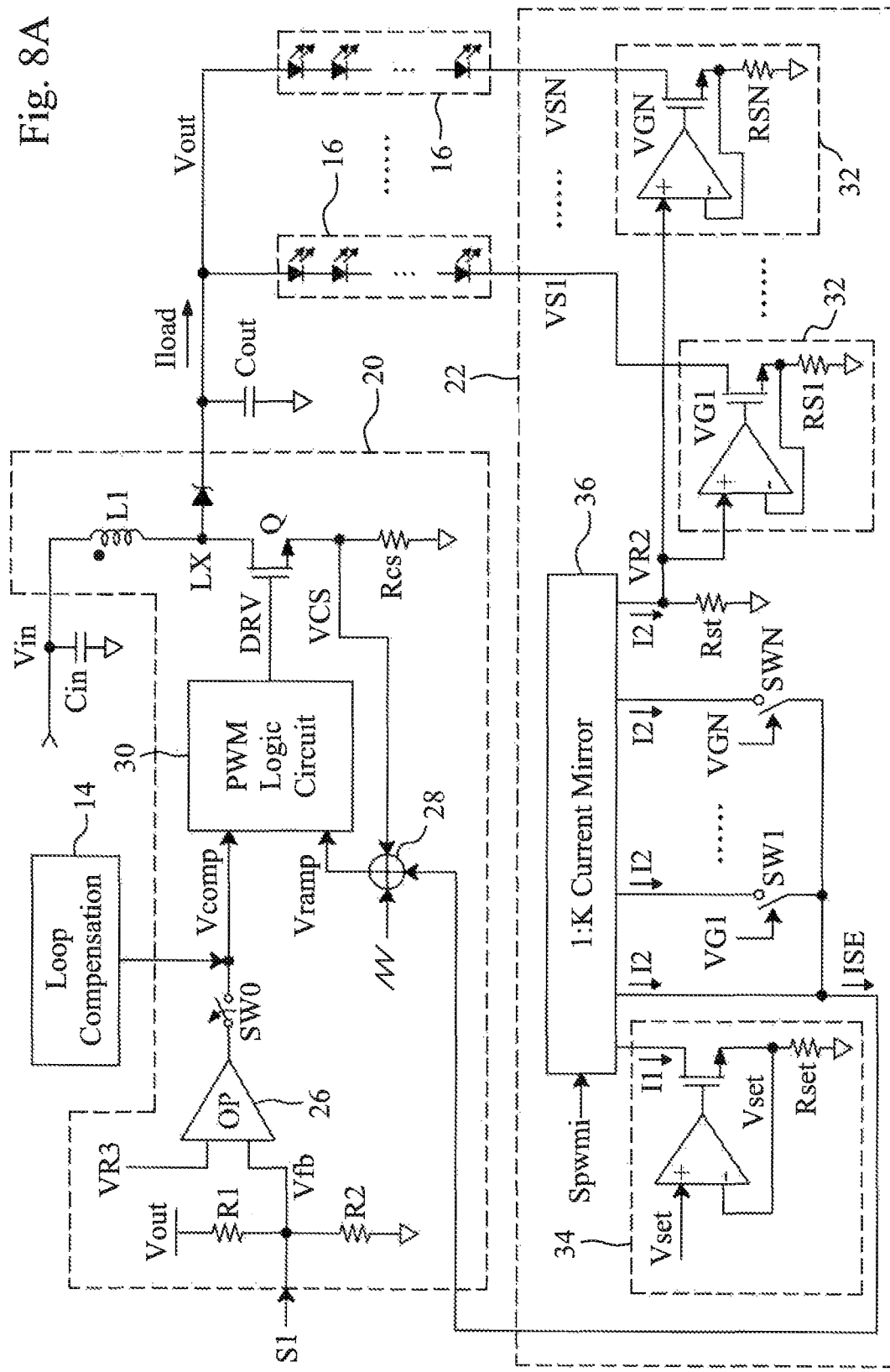
FIGS. 8A and 8B are circuit diagrams of a second embodiment of the LED driver shown in FIG. 4.
Figure 8B:
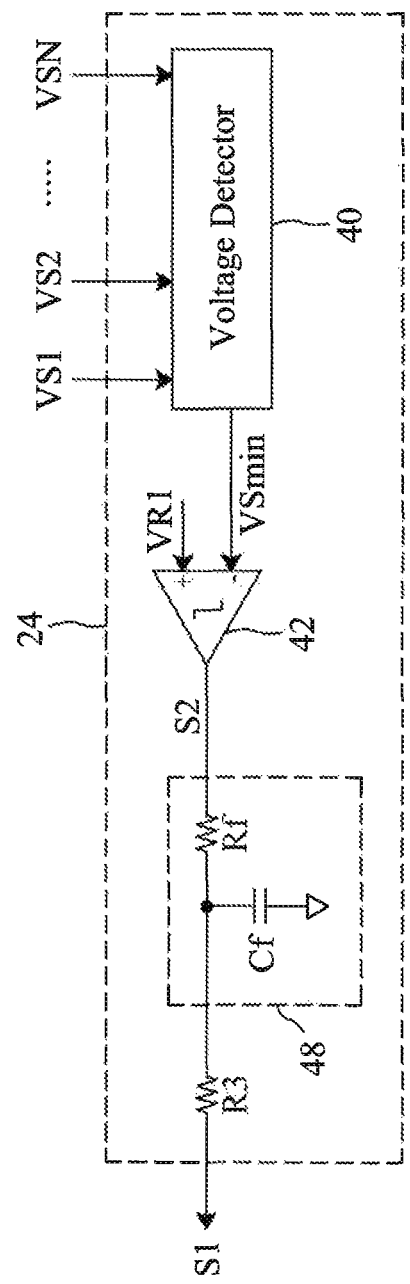

FIGS. 8A and 8B are circuit diagrams of a second embodiment of the LED driver shown in FIG. 4, which has the same power converter 20 and the same current regulator 22 as the circuit shown in FIGS. 5A and 5B, except that the operational amplifier 26 in the power converter 20 amplifies the difference between the feedback signal Vfb and a reference voltage VR3 to generate the compensation voltage Vcomp, as shown in FIG. 8A, and that the sense signal ISE of the current regulator 22 is input to the ramp generation circuit 28 to adjust the ramp signal Vramp and hence the duty ratio of the control signal DRV, thereby accelerating load transient response. In FIG. 8B, the dynamic headroom controller 24 is similar to its counterpart shown in FIG. 5B, including the voltage detector 40 and the hysteretic comparator 42; however, a filter 48 is used in place of the counter and logic circuit 44 and the digital-to-analog converter 46 of FIG. 5B. The filter 48 filters the comparison signal S2 output from the hysteretic comparator 42 and thereby generates the detection signal S1 for adjusting the feedback signal Vfb.

Figure 9:
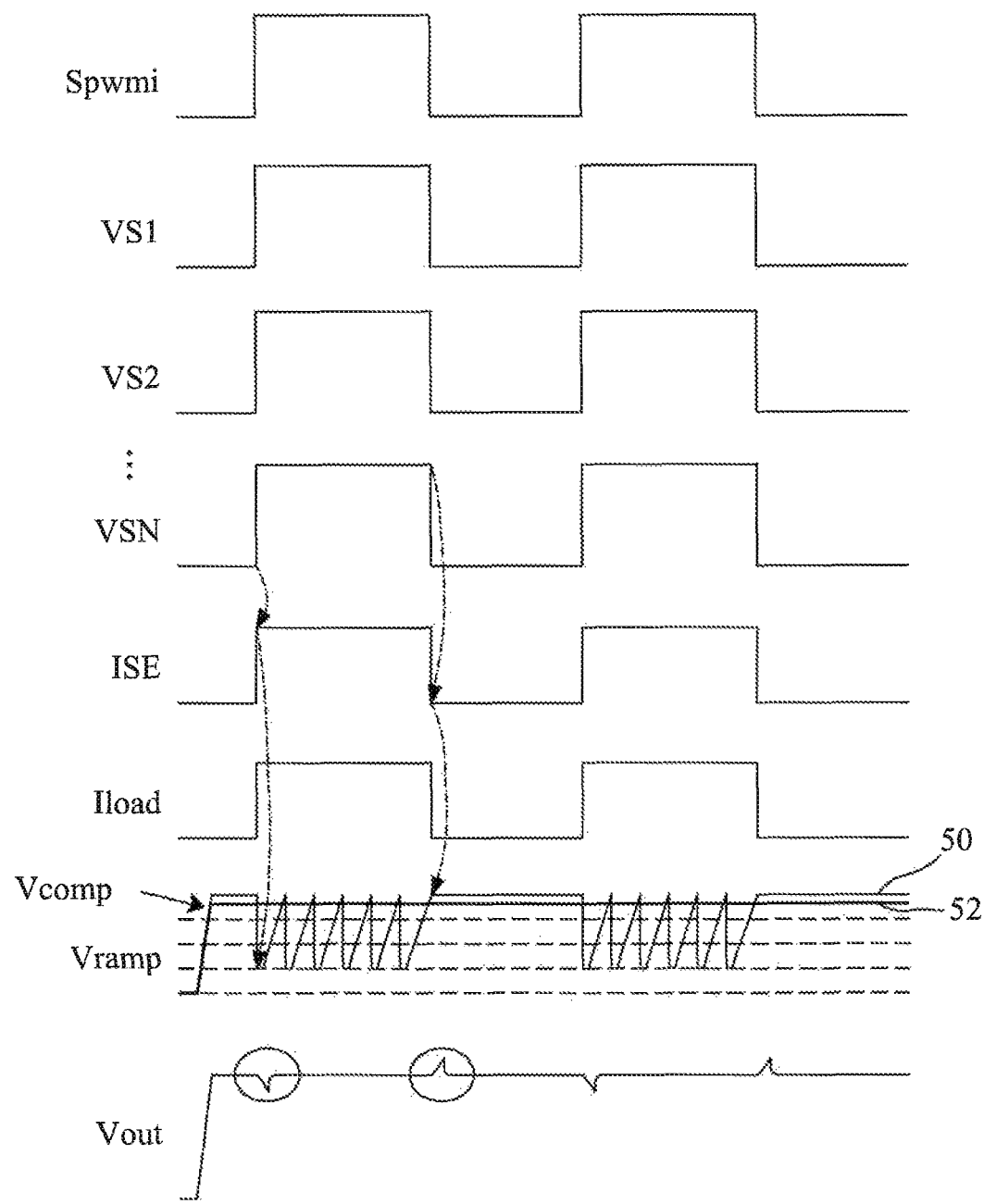
FIG. 9 is a waveform diagram of the signals shown in FIG. 8A.

FIG. 9 is a waveform diagram of the signals shown in FIG. 8A, in which waveform 50 represents the ramp signal Vramp and waveform 52 represents the compensation voltage Vcomp. When the load current Iload shown in FIG. 8A varies, the compensation voltage Vcomp remains unchanged, as shown by the waveform 52, and yet the ramp signal Vramp is instantly adjusted by the sense signal ISE, as shown by the waveform 50, wherein the sense signal ISE is related to the load current Iload. Thus, with the ramp signal Vramp reflecting the variation of the load current Iload in real time, the duty ratio of the control signal DRV varies with the load current Iload instantly. As a result, load transient response speeds up, thereby reducing the ripple amplitude of the output voltage Vout and avoiding generation of audio noise.

Figure 10:
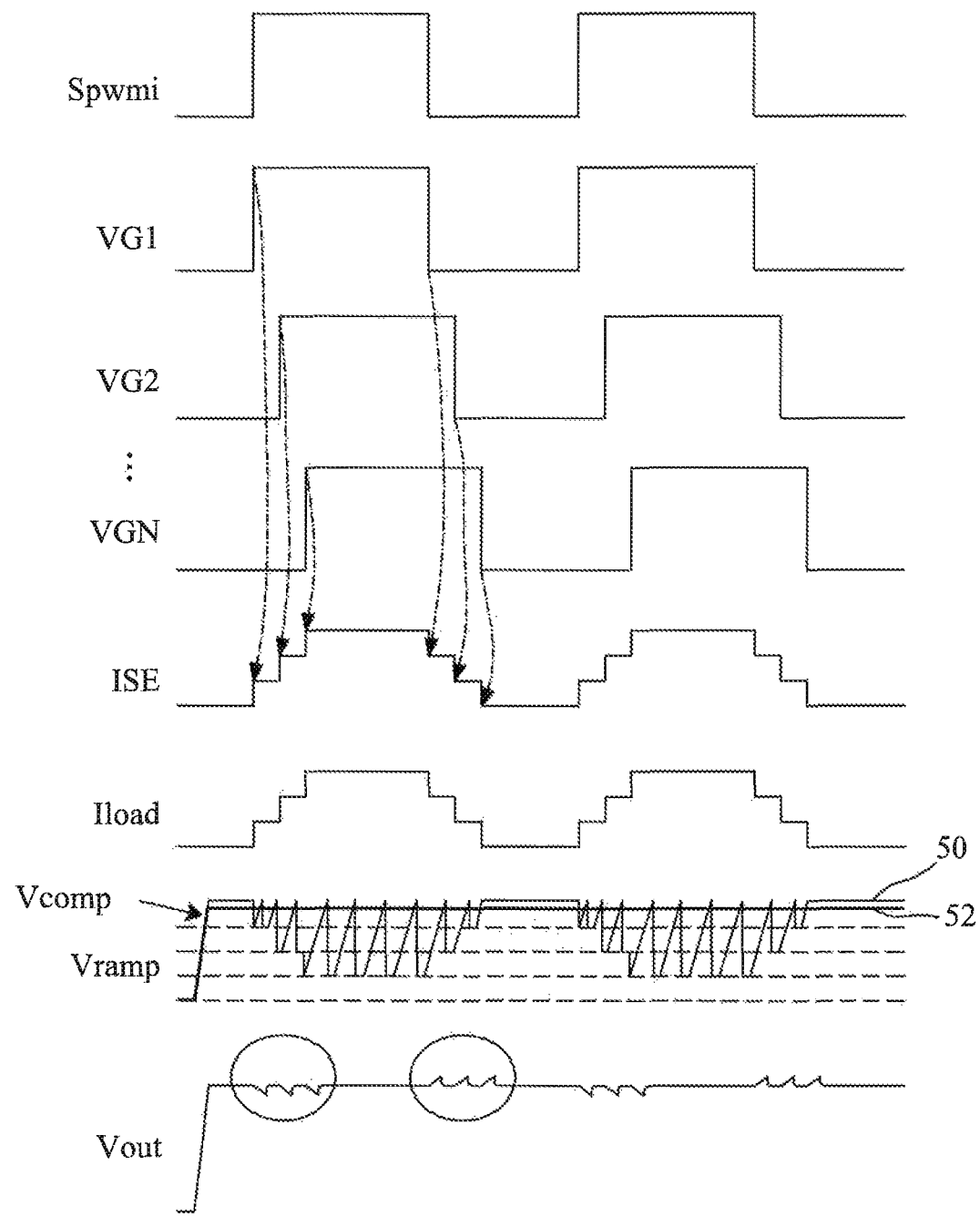
FIG. 10 is a waveform diagram of the signals shown in FIG. 8A when the circuit of FIG. 5A employs phase delay technique.

The phase delay technique is also applicable to the embodiment shown in FIGS. 5A and 5B to further reduce the ripple amplitude of the output voltage Vout, as shown by the waveform diagram of FIG. 10. Assuming that the switch circuits 32 shown in FIG. 8A are provided with delay circuits of different delay times respectively, the switch circuits 32 will be activated or deactivated at different times, which makes the load current Iload to increase or decrease step by step and thus reduces the ripple amplitude of the output voltage Vout. Since the sense signal ISE also rises or falls stepwise with the load current Iload, the ramp signal Vramp varies stepwise, too, as shown by the waveform 50, to reflect in real time the variation of the load current Iload and thereby shorten the load transient response time.

While the present invention has been described in conjunction with preferred embodiments thereof, it is evident that many alternatives, modifications and variations will be apparent to those skilled in the art. Accordingly, it is intended to embrace all such alternatives, modifications and variations that decrease within the spirit and scope thereof as set forth in the appended claims.

What is claimed is:

1. A LED driver using a PWM signal for dimming control, the LED driver comprising:
   a power converter providing an output voltage and a load current for a plurality of LEDs, the power converter comprising:
      an operational amplifier amplifying a difference between a reference voltage and a feedback signal related to the output voltage to thereby generate a compensation voltage; and
      a PWM logic circuit connected to the operational amplifier and configured to generate a control signal according to the compensation voltage and a ramp signal, the control signal having a duty ratio for regulating the output voltage; and
   a current regulator having a plurality of control terminals connected to the plurality of LEDs respectively, and configured to be responsive to the PWM signal to adjust a plurality of LED currents which flow through the plurality of control terminals respectively and determine the load current, and to generate a sense signal related to the load current, the sense signal being applied to the power converter to adjust the duty ratio.

2. The LED driver of claim 1, wherein the power converter employs the sense signal to adjust the compensation voltage to thereby adjust the duty ratio.

3. The LED driver of claim 2, further comprising a dynamic headroom controller connected to the plurality of control terminals and configured to detect voltages at the plurality of control terminals to generate a detection signal determining the reference voltage.

4. The LED driver of claim 3, wherein the dynamic headroom controller comprises:
   a voltage detector connected to the plurality of control terminals and configured to detect the voltages at the plurality of control terminals to extract a minimum voltage therefrom;
   a comparator connected to the voltage detector and configured to compare the minimum voltage with a second reference voltage to thereby generate a comparison signal;
   a counter and logic circuit connected to the comparator and configured to provide a digital signal and to adjust the digital signal according to the comparison signal; and
   a digital-to-analog converter connected to the counter and logic circuit and configured to convert the digital signal into the detection signal.

5. The LED driver of claim 1, wherein the power converter employs the sense signal to adjust the ramp signal to thereby adjust the duty ratio.

6. The LED driver of claim 5, further comprising a dynamic headroom controller connected to the plurality of control terminals and configured to detect voltages at the plurality of control terminals to generate a detection signal for adjusting the feedback signal.

7. The LED driver of claim 6, wherein the dynamic headroom controller comprises:
   a voltage detector connected to the plurality of control terminals and configured to detect the voltages at the plurality of control terminals to extract a minimum voltage therefrom;
   a comparator connected to the voltage detector and configured to compare the minimum voltage with a second reference voltage to thereby generate a comparison signal; and
   a filter connected to the comparator and configured to filter the comparison signal to generate the detection signal.

8. The LED driver of claim 1, wherein the current regulator comprises:
   a current generation circuit generating a first current;
   a current mirror connected to the current generation circuit and configured to mirror the first current to generate the sense signal when the PWM signal is triggered; and
   a plurality of Switch circuits connected to the current mirror and the plurality of control terminals and configured to determine the LED currents which flow through the plurality of control terminals respectively according to a voltage related to the first current.

9. The LED driver of claim 1, wherein the current regulator increases the load current step by step when the PWM signal is triggered and decreases the load current step by step when the PWM signal is terminated.

10. A method for a LED driver using a PWM signal for dimming control, the method comprising the steps of:
   A.) providing an output voltage and a load current for a plurality of LEDs;
   B.) detecting the output voltage to generate a feedback signal;
   C.) amplifying a difference between a reference voltage and the feedback signal to thereby generate a compensation voltage;
   D.) according to the compensation voltage and a ramp signal, generating a control signal having a duty ratio for regulating the output voltage;
   E.) responsive to the PWM signal, adjusting a plurality of LED currents which flow through the plurality of LEDs respectively and determine the load current; and
   F.) generating a sense signal related to the load current to adjust the duty ratio.

11. The method of claim 10, wherein the step F comprises adjusting the compensation voltage responsive to the sense signal to thereby adjust the duty ratio.

12. The method of claim 11, further comprising detecting voltages at output terminals of the plurality of LEDs to generate a detection signal for determining the reference voltage.

13. The method of claim 12, wherein the step of detecting voltages at output terminals of the plurality of LEDs to generate a detection signal for determining the reference voltage comprises the steps of:
   detecting the voltages at the output terminals of the plurality of LEDs to extract a minimum voltage therefrom;
   comparing the minimum voltage with a second reference voltage to generate a comparison signal;
   adjusting a digital signal according to the comparison signal; and
   converting the digital signal into the detection signal.

14. The method of claim 10, wherein the step F comprises adjusting the ramp signal responsive to the sense signal to adjust the duty ratio.

15. The method of claim 14, further comprising detecting voltages at output terminals of the plurality of LEDs to generate a detection signal for adjusting the feedback signal.

16. The method of claim 15, wherein the step of detecting voltages at output terminals of the plurality of LEDs to generate a detection signal for adjusting the feedback signal comprises the steps of:
   detecting the voltages at the output terminals of the plurality of LEDs to extract a minimum voltage therefrom;
   comparing the minimum voltage with a second reference voltage to thereby generate a comparison signal; and
   filtering the comparison signal to generate the detection signal.

17. The method of claim 10, further comprising increasing the load current step by step when the PWM signal is triggered and decreasing the load current step by step when the PWM signal is terminated.

* * * * *